(12) United States Patent
Pinkerton

(10) Patent No.: US 12,459,865 B2
(45) Date of Patent: **\*Nov. 4, 2025**

(54) TWISTED REINFORCEMENT FIBERS AND METHOD OF MAKING

(71) Applicant: Pensmore Reinforcement Technologies, LLC, Ann Arbor, MI (US)

(72) Inventor: Luke Pinkerton, Ann Arbor, MI (US)

(73) Assignee: Helix Steel, LLC, Ann Arbor, MI (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/507,325

(22) Filed: Nov. 13, 2023

(65) Prior Publication Data

US 2024/0076234 A1    Mar. 7, 2024

Related U.S. Application Data

(63) Continuation of application No. 17/056,154, filed as application No. PCT/US2018/033325 on May 18, 2018, now Pat. No. 11,845,693.

(51) Int. Cl.
| | |
|---|---|
| *B28B 1/52* | (2006.01) |
| *C04B 14/48* | (2006.01) |
| *C04B 28/02* | (2006.01) |
| *D01F 9/08* | (2006.01) |
| *B28C 5/40* | (2006.01) |
| *C04B 103/00* | (2006.01) |
| *C04B 103/56* | (2006.01) |

(52) U.S. Cl.
CPC .............. *C04B 14/48* (2013.01); *B28B 1/523* (2013.01); *C04B 28/02* (2013.01); *D01F 9/08* (2013.01); *B28C 5/402* (2013.01); *C04B 2103/0014* (2013.01); *C04B 2103/58* (2013.01); *C04B 2201/00* (2013.01); *D10B 2101/20* (2013.01)

(58) Field of Classification Search
CPC . C04B 14/48; C04B 28/02; C04B 2103/0014; C04B 2103/58; C04B 2201/00; B28B 1/523; B28B 1/53; D01F 9/08; B28C 5/402; D10B 2101/20; E04C 5/00; E04C 5/01; E04C 5/012; B21F 11/00; B21F 5/00; B21F 7/00; G01N 33/38; G01B 5/30

See application file for complete search history.

(56) References Cited

U.S. PATENT DOCUMENTS

| | | | |
|---|---|---|---|
| 3,802,241 A | 4/1974 | Huhnen | |
| 4,804,585 A | 2/1989 | Tani et al. | |
| 6,060,163 A | 5/2000 | Naaman | |
| 6,858,075 B1 * | 2/2005 | Von Fay | C04B 28/02 106/737 |
| 2005/0129931 A1 * | 6/2005 | Pilakoutas | E04C 5/012 428/292.1 |
| 2015/0184318 A1 * | 7/2015 | Pinkerton | B21F 7/00 106/644 |
| 2015/0251952 A1 | 9/2015 | Byrd | |

FOREIGN PATENT DOCUMENTS

| | | | |
|---|---|---|---|
| CN | 207160420 U | 3/2018 | |
| JP | 2000247697 A * | 9/2000 | ............. C04B 14/48 |
| KR | 20110053541 A | 5/2011 | |
| KR | 20130060481 A * | 6/2013 | |

OTHER PUBLICATIONS

JP-2000247697-A, machine translation (Year: 2000).*
KR-20130060481-A, machine translation (Year: 2013).*
Naaman, Antoine E., "Engineered Steel Fibers with Optimal Properties for Reinforcement of Cement Composites," Journal of Advanced Concrete Technology, vol. 1, No. 3, Nov. 2003, pp. 241-252.

* cited by examiner

*Primary Examiner* — Amber R Orlando
*Assistant Examiner* — Marites A Guino-O Uzzle
(74) *Attorney, Agent, or Firm* — Dickinson Wright PLLC

(57) ABSTRACT

A composite material used to form a concrete structure that includes a concrete matrix formed of a mixture of aggregates and a paste and a mixture of twisted steel micro-reinforcements (TSMRs) dispersed within the concrete matrix. The TSMRs have a variable twist pitch; wherein the twist pitch of a portion of the TSMRs is in the range of 6 to 20 twists per 25.4 mm (1 inch) applied along its longitudinal axis. The TSMRs are made from a common base stock and have the number of twists predetermined, such that the concrete structure exhibits at least 10% greater performance in one or more of a stress, deflection, energy, or crack mouth opening (CMOD) properties as determined through one or more defined standard tests than a similar concrete structure formed with the same amount by weight of steel fibers having one or two bends.

25 Claims, 6 Drawing Sheets

TWISTED REINFORCEMENT FIBERS AND METHOD OF MAKING

CROSS REFERENCE TO RELATED APPLICATIONS

This application a continuation of U.S. patent application Ser. No. 17/056,154 filed on Nov. 17, 2020, which is the national stage application for International Application No. PCT/US2018/033325 filed on May 18, 2018, designating the United States and published in English, the entire content of which are incorporated herein by reference in their entirety.

FIELD

This disclosure relates generally to twisted steel micro-reinforcements (TSMR) for use in forming a composite matrix and method of making the same. More specifically, this disclosure relates to a composite structure comprising a mixture of concrete and twisted reinforcing fibers.

BACKGROUND

The statements in this section merely provide background information related to the present invention and may not constitute prior art.

U.S. Pat. No. 4,804,585 describes concrete reinforcing steel fibers that have an alternate arrangement of basic portions corresponding to the body of the steel fiber material and section-shaped portions formed by pressing the steel fiber material between a grooved forming roller and a toothed forming roller.

U.S. Pat. No. 6,060,163 describes fibers, continuous or discontinuous, and bars for use in the reinforcement of cement, ceramic, and polymeric-based matrices in which the geometry of the fibers increases the ratio of surface area available for bonding between the fibers and matrix to the cross-sectional area of the fibers.

Several design approaches have been developed and have been adopted in different parts of the world for determining the concentration of fibers to use in forming a concrete structure. Some design approaches rely on measuring direct tension, while other approaches rely on flexural beam testing. The tensile stress measurements used in for design purposes is taken from laboratory tests at various displacements or deflections depending on designer's specific needs. Some design engineers prefer a product that produces the highest peak pre-crack stress, while other design engineers look for optimum performance at a particular design crack width. Yet other design engineers would rather look for a particular shape of the load deflection curve obtained in a beam test. However, in each of these design approaches, the only way to change performance using existing fiber technology is to change the dosage of the fibers present in the concrete structure (i.e., the magnitude of fiber mass added per unit volume concrete).

SUMMARY

The present disclosure generally provides a concrete structure for use in a predetermined application. The concrete structure comprises a mixture of concrete and a plurality of custom manufactured twisted steel micro-reinforcements (TSMRs). Each TSMR has a twist pitch, which is defined as being two or more twists per inch applied along its longitudinal axis. The TSMRs are formed from a common base stock and have the number of twists predetermined such that a concrete structure with at least 10 wt. % per unit volume less TSMRs than fibers present in a conventional concrete structure exhibits the same or better performance than the conventional concrete structure in one or more of a stress, deflection, energy, or crack mouth opening (CMOD) properties as determined through one or more defined standard tests. Alternatively, the concrete structure comprises at least 25 wt. % per unit volume less TSMRs, alternatively, at least 40 wt. % per unit volume less TSMRs than fibers present in the conventional concrete structure.

According to one aspect of the present disclosure, the defined standard test(s) are independently selected. The defined test(s) may be selected to be an un-notched deflection controlled beam test; an un-notched load controlled beam test; a splitting tensile test; a deflection controlled notched beam test; a test that measures average residual stress; a panel test; or a direct tensioning test.

The un-notched deflection controlled beam test may be, without limitation, ASTM C 1609 or fe3 with performance measured at a ratio of L/150 or L/600. When desirable the ratio of L/150 or L/600 can be an average value of at least two tests. In some cases, the ratio of L/150 or L/600 may approach 1.

The defined test(s) may also be selected from the following standard protocols without limitation. For example, the un-notched deflection controlled beam test may be JSCE SF-4 wherein performance measured as flexural strength or flexural toughness factor. The un-notched load controlled beam test may be ASTM C 78 or EN 12390. The splitting tensile test may be ASTM C 497, EN 12390-6, or AS 1012.10-2000. The deflection controlled notched beam test may be EN 14651 with performance measured at LOP, fr1, fr2, fr3, or fr4. The defined residual stress test may be ASTM C1399. The panel test may be EFNARC, ASTM C1550, or RDP with performance measured at a user defined central deflection. Finally, the direct tensioning test may be UES EC 015.

The twist pitch of the TMSRs is within the range of 2 to 20 twists per 25.4 mm (1 inch). The TSMRs are made of hard drawn, high tensile wire having a diameter that is no smaller than 0.5 mm and no larger than 2.0 mm. When desirable, the TSMRs may have an aspect ratio of length (L) to diameter (D) that is between about 25 to about 100.

According to yet another aspect of the present disclosure a method of forming a concrete structure is provided. This method comprises providing a mixture of concrete; providing a plurality of custom manufactured twisted steel micro-reinforcements (TSMRs); mixing the plurality of TSMRs into the concrete; forming a concrete structure; and allowing the concrete structure to at least partially cure. Each of the TSMRs has a twist pitch of two or more twists per inch applied along its longitudinal axis. The TSMRs are made from a common base stock and have the number of twists predetermined such that a concrete structure formed with at least 10 wt. % per unit volume less TSMRs than fibers present in a conventional concrete structure exhibits the same or better performance than the conventional concrete structure in one or more of a stress, deflection, energy or crack mouth opening (CMOD) properties as determined through a defined standard test.

The method may be a continuous process. This continuous process may further comprise one or more variable speed motor drives in order to increase or decrease the speed of the process and/or a twisting apparatus to change the twist pitch applied along longitudinal axis of the TSMRs. The twist pitch of the TSMRs may be increased or decreased without the need for a tooling change. Rather, the twist pitch may be altered by changing at least one accessible gear or pulley located on a machine positioned within the process.

Further areas of applicability will become apparent from the description as provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
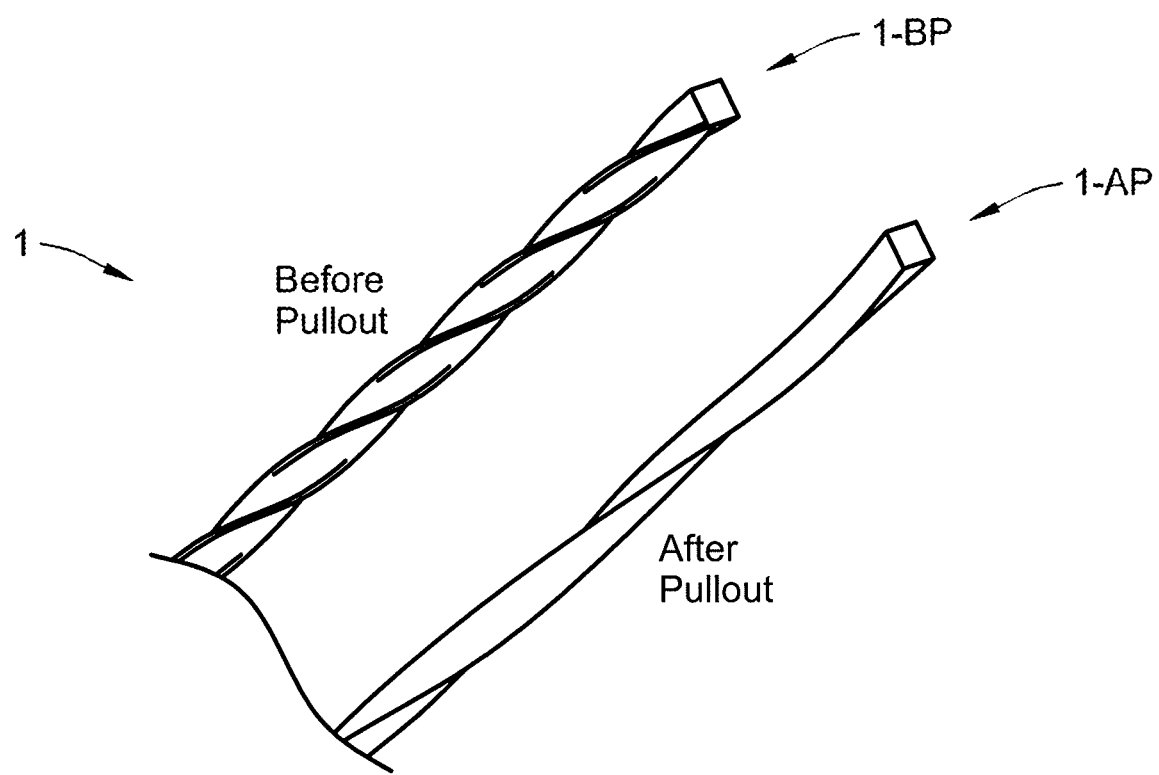
FIG. 1 is a schematic representation of a Twisted Steel Micro Reinforcement (TSMR) before and after pull-out according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the twisted steel micro-reinforcements (TSMRs) made and used according to the teachings contained herein is described throughout the present disclosure in conjunction with a concrete structure in order to more fully illustrate the composition and the use thereof. The incorporation and use of TSMRs in applications that require the use of other composite materials instead of concrete are contemplated to be within the scope of the present disclosure. It should be understood that throughout the description, corresponding reference numerals indicate like or corresponding parts and features.

The present disclosure generally provides a concrete structure formed as a mixture of concrete with a plurality of twisted steel micro-reinforcements (TSMRs). The TSMRs are made from a common base material, but with a variable twist pitch. As used herein the term "twist pitch" is defined as the number of twists per 25.4 mm (1 inch) unit length of the TSMRs. According to another aspect of the present disclosure a manufacturing method is also provided that is flexible enough to allow for the twist pitch to be changed without any substantial change-over cost or time. The variable twist TSMRs and the method of manufacturing provide the opportunity to customize performance of the concrete structure to a given test standard without the need to change the TSMR dosage (i.e., mass of TSMR added to the concrete per unit volume). Within the present disclosure, the mass of the TSMR is given as kilograms or as pounds with the associated unit volume being given as cubic meters or cubic yards, respectively. Thus, a dosage described as 10 wt. % per unit volume less than a conventional dosage may refer to 10 wt. % per cubic meter less than the conventional dosage when weight is measured in kilograms or 10 wt. % per cubic yard less than the conventional dosage when weight is measured in pounds.

The use of the TSMRs in a concrete structure as prepared according to the present disclosure provides a design engineer with more options for meeting a given specification for an application at lower dosages than necessary for similar concrete structures using conventional fiber reinforced fibers. The TSMRs of the present disclosure typically provide improved workability of the concrete and better economic value than conventional fibers. The use of these TSMRs increases the modulus of rupture of the concrete even at lower dosages.

The manufacturing process of the present disclosure, which can vary the twist pitch (number of twists per unit length) of the TSMRs using the same base product, can be adjusted to provide optimum performance of a concrete structure thereby meeting a design engineer's requirements that are based on test criteria and concrete mix design. This optimization of the performance associated with the concrete structure allows for lower dosages and therefore increased economy, as well as decreased carbon footprint (less steel is required) versus conventionally used technology. In addition, the concrete structure formed according to the present disclosure allows for higher levels of performance than previously possible for the incorporation of fibers into a concrete.

In the context of the present disclosure, the term "concrete" means a mixture of aggregates and paste, wherein the aggregates may be sand, gravel, crushed stone, or a mixture thereof, while the paste comprises water and Portland cement.

Reinforcement fibers are used to enhance the properties of concrete and other matrix materials. The performance of the fibers depends on several factors including tensile strength, modulus of elasticity, bond strength and geometry. Performance of the composite (concrete matrix and reinforcement fiber mixture) can be measured using standardized tests that measure composite tensile, bending, shear or compressive strength. Engineers use the data from these tests for design purposes and often reference them in construction specification documents. There are many test standards that can be used to measure the properties of the composite, including without limitation, the standard test methods shown in Table 1, wherein COV represents the coefficient of variation.

There are several different fiber design procedures that a design engineer may utilize when designing a concrete structure. These design procedures are shown without limitation in Table 2. Although the fib Model Code 2010 procedure may become the general standard for fiber design in Europe, a new fiber design method was recently approved in Australia that is similar to the Model Code approach but contemplates as an option to use direct tension design. Further information concerning the different fiber design procedures can be found in the following documents, the contents of each being hereby incorporated by reference in their entirety: (i) CEB FIB Model Code 2010, Federation of Structural Concrete (2010); (ii) A. Amin, S. Foster, and A. Muttoni, *"Evaluation Of The Tensile Strength Of SFRC As Derived From Inverse Analysis Of Notched Bending Tests"*, VIII International Conference on Fracture Mechanics of Concrete and Concrete Structures, 2013; (iii) EC-015, Uniform Evaluation Service Evaluation Criteria #015, Uniform Evaluation Service, 5001 E. Philadelphia St. Ontario, CA 91761—USA (2014); (iv) ACI 318-11: Building Code Requirements for Structural Concrete. American Concrete Institute, 2011; (v) EN 1992-2004, Eurocode 2, Design of Concrete Structures, European Committee for Standardization, 2004; (vi) AS 3600, Australian Standard Concrete Structures, Standards Australia, 2009; (vii) Papworth, F.: "Design guidelines for the use of fibre reinforced shotcrete in ground support", 27th Conference on Our World In Concrete & Structures, (2002), p. 29-30; and (viii) DR AS 5100.5-16, Section 16 Steel Fibre Reinforced Concrete.

crack widths are favorable (when water infiltration is a concern) in structures like civil tunnels. In others structures, like temporary tunnel linings in mines, larger crack widths are acceptable. The main factor in determining a preference is whether or not the design objective centers around the serviceability (i.e., keeping cracks small at operating/service loads) or ultimately limit state (i.e., keeping the structure together in the event of a severe overload). Other design

TABLE 1

Standard Test Methods

| Test Identification | Type | Control | Measurement | Single Operator COV |
|---|---|---|---|---|
| ASTM C78 AS 1012.11-2000 | Flexural Beam | Load | Peak only Post crack* | 5.7% |
| ASTM C1609 | Flexural Beam | Deflection | Peak Post crack | Peak: 8.2% Post: 17% |
| JSCE SF4 | Flexural Beam | Deflection | Peak Post crack | Not Reported |
| ASTM C1399 | Flexural Beam | Load | Post Peak only | 13% |
| ASTM C1550 RDP | Flexural Round Panel | Deflection | Peak Post crack | Peak 6.2% Post 10% |
| EFNARC | Flexural Square Panel | Deflection | Peak Post crack | Not Reported |
| EN 14651 | Flexural Notched Beam | Crack Width | Post crack only | Not Reported |
| EN 12390-5 | Flexural Beam | Load | Peak only Post crack* | Not Reported |
| RILEM TC 162-TDF | Flexural Notched Beam | Deflection | Post crack only | Not Reported |
| ASTM C496 EN 12390-6 AS 1012.10-2000 | Splitting Tensile | Load | Peak Post crack* | 5% |
| UES EC 015 | Direct Tension | Deflection | Peak crack Post crack | Peak 6.3% Post 11% |

Still referring to Table 2, in the competing design approaches and methods, the design crack widths are different for the different design methods. Some of the more robust approaches, like RILEM TC 162 TF, include some statistical considerations for variations in test results. UES EC 015 is the only method evaluated that employs the Load and Resistance Factor Design (LRFD) method for deriving resistance factors employed by the world's major design codes. Some design methods favor fibers that perform best when crack widths and deflections are small, other methods favor fibers that perform best when the deflection and/or crack width is large. The reason for the preference is not always clear. However, in some cases, for example, smaller methods rely only on the peak strength of the concrete and assume the existence of pure elastic conditions.

The Papworth 2002 method of design for shotcrete is the only empirical approach evaluated. It uses the relationship between energy (too large deflection) in the round or square panel testing to rock type presented in a prescriptive table instead of a physics-based tensile strength approach. This method favors fibers that behave well at large deflections (e.g., crack widths) in the round panel tests.

TABLE 2

Fiber Design Methods

| Design Approach | Application and Criteria | Design Assumption | Test | Test vs design Stress Model |
|---|---|---|---|---|
| ACI-360 | Slabs only cracked stress | 4 mm crack Yield Line | ASTM C1609 | Linear, Re3 |
| RILEM TC 162-TDF | General, cracked stress & strain | 1.5 mm 3.5 mm crack | EN 14651 | Bi-Linear $f_{R,1} \times 0.45$; $f_{R,4} \times 0.37$ |
| Concrete Society TR-34 | Slabs only cracked stress | 3.5 mm crack Yield Line | EN 14651 | Bi-Linear $f_{R,4} \times 0.37$ |
| Fib Model Code 2010 | General, cracked stress | 0.5 mm or 2.5 mm crack | EN 14651 | Bi-Linear $f_{R,1} \times 0.45$; $f_{R,3}/3$ |
| Papworth 2002 | Shotcrete | Energy to 40 or 80 mm deflection | ASTM C1550, RDP | Empirical Table of Energy |
| DR AS 5100.5-16 | Bridges | 1.5 mm crack | Direct Tension or EN 14651 | Director or Bi-Linear $f_{R,4} \times 0.4$; $f_{R,2} \times 0.7$ |

TABLE 2-continued

Fiber Design Methods

| Design Approach | Application and Criteria | Design Assumption | Test | Test vs design Stress Model |
|---|---|---|---|---|
| UES EC015/ER 279 | Stress & Strain | Peak or 1 mm crack | EC 015 | Not Required |

Further higher tensile strength concrete could provide additional benefits to designs using provisions for elastic design and plain concrete design. Several elastic design approaches are shown without limitation in Table 3. Unlike with conventional non-linear reinforced concrete design, these approaches consider concrete tensile strength.

TABLE 3

Elastic Design Provisions

| Design Approach | Application and Criteria | Design Assumption | Test | Crack Width |
|---|---|---|---|---|
| EN 1992 | General Section 5.4 | Elastic Design | EN 12390-6 | Elastic |
| AS 3600 | General Section 3.1.1.3 | Elastic Design | AS 1012.11-2000 | Elastic |
| ACI 318 | General Chapter 22 | Elastic Design | ASTM C78 ASTM C496 | Elastic |
| CSA 23.3 | General Section 22.6.5 | Elastic Design | ASTM C78 ASTM C496 | Elastic |

A concrete structure formed according to the teachings of the present disclosure can be designed for use in a predetermined application. The concrete structure so designed will comprise, consist essentially of, or consist of a mixture of concrete and a plurality of custom manufactured twisted steel micro-reinforcements (TSMRs). Each TSMR has a twist pitch of two or more twists per inch applied along its longitudinal axis. The TSMRs are made from a common base stock and have the number of twists predetermined such that a concrete structure can be formed with at least 10 wt. % per unit volume less TSMRs than fibers in a conventional concrete structure and still exhibit the same or better performance than the conventional concrete structure in one or more of a stress, deflection, energy, or crack mouth opening (CMOD) properties as determined through one or more defined standard tests. Alternatively, the concrete structure comprises at least 25 wt. % per unit volume less TSMRs, alternatively, at least 40 wt. % per unit volume less TSMRs than fibers present in the conventional concrete structure.

Notwithstanding the foregoing, a concrete structure formed with TSMRs according to the teachings of the present disclosure will inherently exhibit substantially enhanced performance in one or more of a stress, deflection, energy, or crack mouth opening (CMOD) properties as compared to a conventional concrete structure formed using the same weight per unit volume of fibers. Alternatively, the enhanced performance in properties exhibited by the concrete structure formed with TSMRs as compared to the conventional concrete structure with the same weight per volume amount of fibers may be characterized as being at least 10% greater; alternatively, greater than about 15%; alternatively, greater than about 20%. Thus, one skilled-in-the-art may utilize at least 10 wt. % per unit volume less TSMRs than fibers in a conventional concrete structure to obtain at least the same performance or utilize the same weight per unit volume TSMRs as fibers in a conventional concrete structure to obtain substantially enhanced performance without exceeding the scope of the present disclosure.

The concrete structure of the present disclosure comprises a s of TSMRs with a variable twist pitch. The performance of the concrete structure at the modulus of rupture (MOR), as well as at other predetermined points is enhanced by changing the degree of the twist(s) of the TSMRs, while keeping the material composition of the TSMRs constant. The concrete structure of the present disclosure exhibits improved consistency of performance, e.g., smaller coefficient of variation (COV). The higher the COV, the more the mean value is penalized or varies when computing characteristic performance values.

For the purposes of this disclosure, the term "conventional concrete structure" defines a concrete structure in which conventional fibers are mixed into the concrete as reinforcements. These conventional fibers include any form of discontinuous reinforcement mixed into concrete made of any material including but not limited to, synthetic materials (e.g. glass, polymer, carbon), natural materials (e.g., basalt, plant fibers) and metal (e.g. steel, stainless steel).

The defined standard test(s) may be selected to be an un-notched deflection controlled beam test; an un-notched deflection controlled beam test; an un-notched load controlled beam test; a splitting tensile test; a deflection controlled notched beam test; a test that measures average residual stress; a panel test; or a direct tensioning test.

Figure 3:
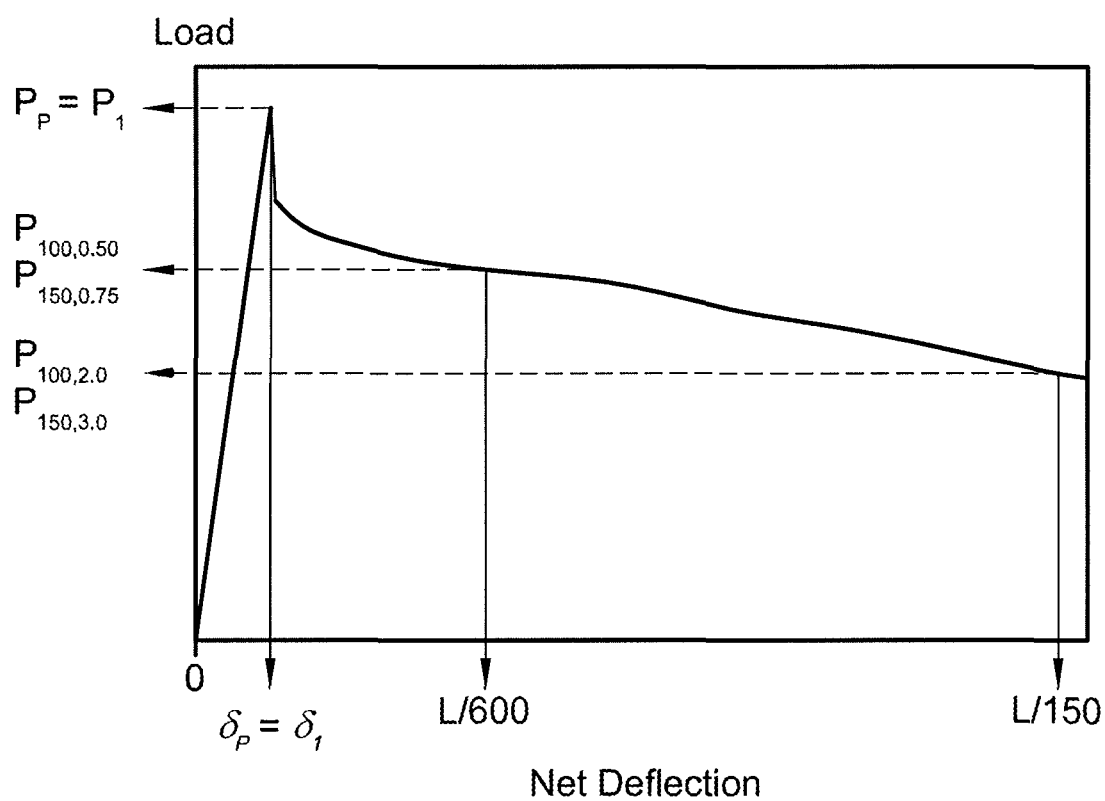
FIG. 3 is a load deflection curve obtained in an un-notched flexural test according to ASTM C 1609 highlighting critical points for design at L/150 and L/600.

The un-notched deflection controlled beam test may be, without limitation, ASTM C 1609 or fe3 with performance measured at the peak (modulus of rupture) or at deflections based on a ratio of L/150 or L/600. When desirable the ratio of L/150 or L/600 can be an average value of at least two tests. In some cases, the ratio of L/150 or L/600 may approach the value of 1. Referring now to FIG. 3 a load deflection curve obtained in an un-notched flexural test according to ASTM C 1609 is shown. This curve represents a plot of the applied load as a function of net deflection. The critical points for a design are highlighted in the plot at deflections equal to $\delta1$, L/150, and L/600. The engineer may elect to use the load carried at each of these points in design. The net deflection is a measure of the deflection at mid span and is an indirect measurement of crack width. Design codes typically will use values at $\delta_1$ for structural plain concrete design. The other two values are typically used in various design approach that assume post crack design (reinforced concrete design). The values at L/150 for ultimate strength design (when design is driven by the capacity at ultimate) and L/600 for serviceability design (when the design is driven by controlling cracks and deflection). The defined test(s) may also be selected from the following standard protocols without limitation.

For example, the un-notched deflection controlled beam test may be JSCE SF-4 wherein performance measured as flexural strength or flexural toughness factor. The un-notched load controlled beam test may be ASTM C 78 or EN 12390 wherein the performance measured is the modulus of rupture. The splitting tensile test may be ASTM C 497, EN 12390-6, or AS 1012.10-2000. The deflection controlled notched beam test may be EN 14651 with performance measured at LOP, fr1, fr2, fr3, or fr4. The defined residual stress test may be ASTM C1399. The panel test may be EFNARC, ASTM C1550, or RDP with performance measured at a user defined central deflection. Finally, the direct tensioning test may be UES EC 015. Additionally since design values are often computed based on Characteristic (e.g., 5% Fractal as per ISO 12491), the consistency of the results (coefficient of variation) is also important for design. This could apply to any test result described above.

The twisted steel micro-reinforcements (TSMRs) are made from high carbon, cold-drawn, deformed steel wires that comply with ASTM A 820, Type I. This steel wire has a tensile strength of 1850 MPa. TSMR may come in various diameters and lengths. Typically, the TSMRs are made of hard drawn, high tensile wire having a diameter that is no smaller than 0.5 mm and no larger than 2.0 mm. The length of the TSMRs may range from about 5 mm to about 100 mm. Several examples of different sized TSMRs include without limitation TSMR 5-25 (0.5 mm×25 mm length) and TSMR 8-50 (0.8 mm×50 mm length). TSMR 5-25 has been proven to enhance modulus of rupture (MOR), splitting tensile and provides stable post crack performance. It can be successfully used to replace rebar and wire mesh. TSMR 8-50 uses the same TSMR technology and advantages as TSMR 5-25, but its performance is optimized for standard post crack beam test performance (EN 14651) while still offering an enhanced modulus of rupture (MOR) and splitting tensile strength.

Referring now to FIG. 1, the TSMR product 1 is produced with a unique twisted profile that allows each piece to bond to the matrix over its full length. In addition, the TSMR product 1 must untwist as it pulls out of the concrete. The existence of the unique twisted profile 1-BP and the occurrence of untwisting, thereby, forming an untwisted profile 1-AP are shown in FIG. 1. This makes the TSMR product 1 significantly different from traditional steel fibers because pull-out is governed by untwisting resistance rather than friction. The TSMR product 1 is active in both the "proactive phase" (pre-crack), increasing peak tensile strength, and during the "reactive phase" (post-crack) providing ductility and stable tensile resistance to the development of large crack widths.

The twisted profile of the TSMR product 1 may be differentiated from steel fibers that have a middle section and anchorage end(s) with one bent section or two consecutive bent sections. In this case, the middle section is generally straight, rectilinear, wavy, or undulated, rather than twisted as in the TSMR product 1. The TSMR product 1 may be further differentiated from steel fibers that have hooked ends. One drawback of such conventional types of steel fibers is that these fibers tend to coagulate during mixing, e.g., becoming entangled and/or form balls, with the end-result being that the fibers are not homogenously distributed throughout the mortar used to form the concrete structure.

According to one aspect of the present disclosure, it is possible to increase or decrease the amount of twist in each fiber in order to modify the performance of a composite in order to pass a specific standardized test or meet a required specification for the matrix composite without changing the fiber dosage in the concrete structure. In comparison, conventional fiber materials require the amount of twist to be fixed. Thus in order to meet the predetermined specification, the dosage of conventional fibers in the concrete structure may need to be increased. The ability to change both the number of twists and the dosage provides the design engineer with the ability to optimize both the fiber's performance and economic value for use in a predetermined concrete structure. The development of a manufacturing process capable of making TSMR with different amounts of twist enables the ability to provide for the first time, "mass customization" in the concrete reinforcement fiber industry.

Figure 2A:
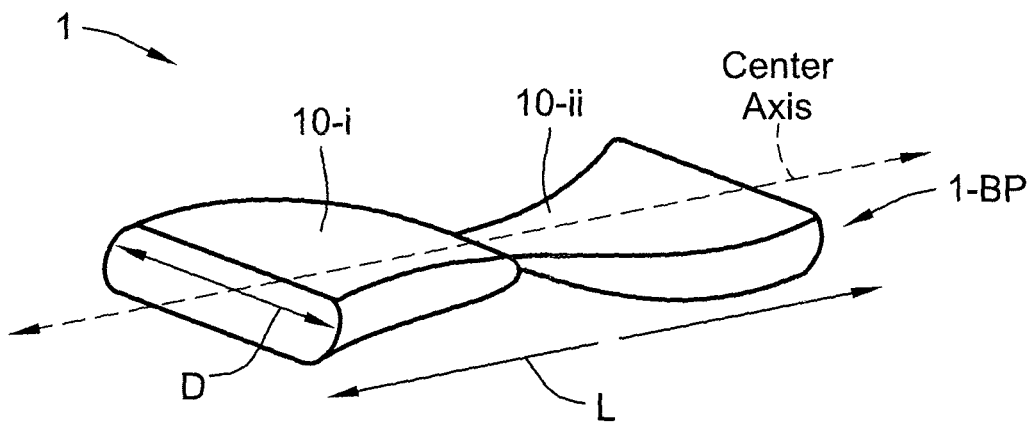
FIG. 2A is a perspective schematic representation of a TSMR with two twists per inch along the TSMR's length.
Figure 2B:
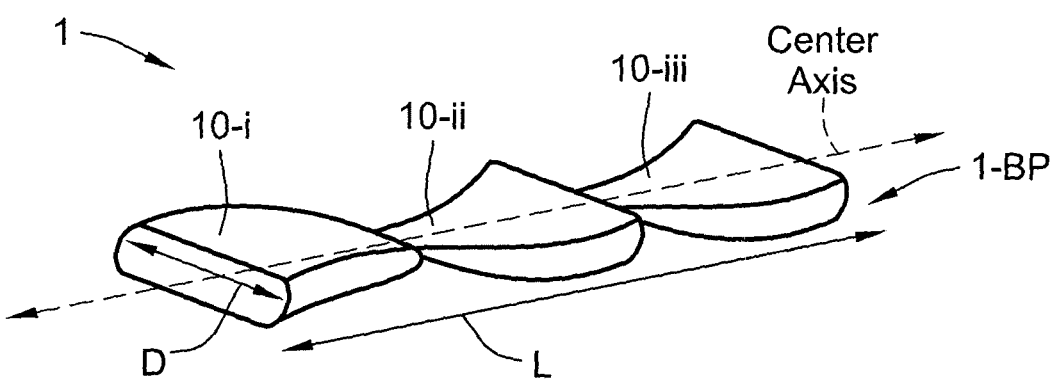
FIG. 2B is a perspective schematic representation of TSMRs with three twists per inch along the TSMR's length.

The TSMR 1-BP of the present disclosure has at least two twists 10(i-ii) per 25.4 mm (1 inch) along its length L as shown in FIG. 2A. The number of twists 10 may be greater than two per 25.4 mm (1 inch) when desired or necessary to meet a predetermined specification. For example, in FIG. 2B a TSMR 1-BP is shown with three twists 10(i-iii) per 25.4 mm (1 inch) along its length L. One skilled in the art will understand that it is possible to further increase the number of twists 10 per inch in the TSMR 1-BP above three without departing from the scope of the present disclosure. Alternatively, the number of twists per inch along the length L of the TSMR 1-BP may be two, three, or a mixture thereof. Alternatively, the twist pitch of the TMSRs is within the range of 2 to 20 twists per 25.4 mm (1 inch). The TSMRs have an aspect ratio of length (L) to diameter (D) that is between about 25 to about 100.

The following specific examples are given to illustrate the performance exhibited by concrete structures comprising fibers that have a different degree of twists formed from the same base material used in different applications, as well as the methods of preparing the same, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Steel fibers are often specified in precast tunnel segments. This specification typically requires a minimum bending strength at a specified deflection in a standardized test, like ASTM C1609. The specifications associated with several different applications are shown in Table 4. This table also shows that fibers made out of the same 0.8 mm base material with either 2 or 3 twists per inch (25 mm) can be used to meet the required specification for different types of structures.

Figure 4:
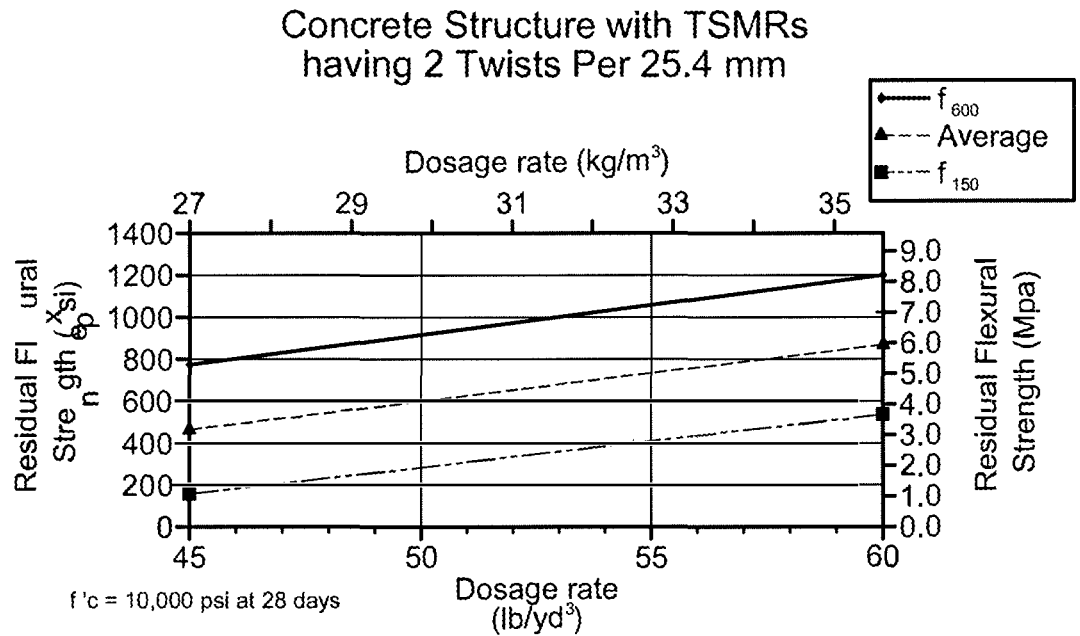
FIG. 4 is a graphical representation of residual flexural strength measured according to ASTM C 1609 for a concrete structure containing TSMRs with two twists per 25.4 mm (1 inch) plotted as a function of dosage rate.
Figure 5:
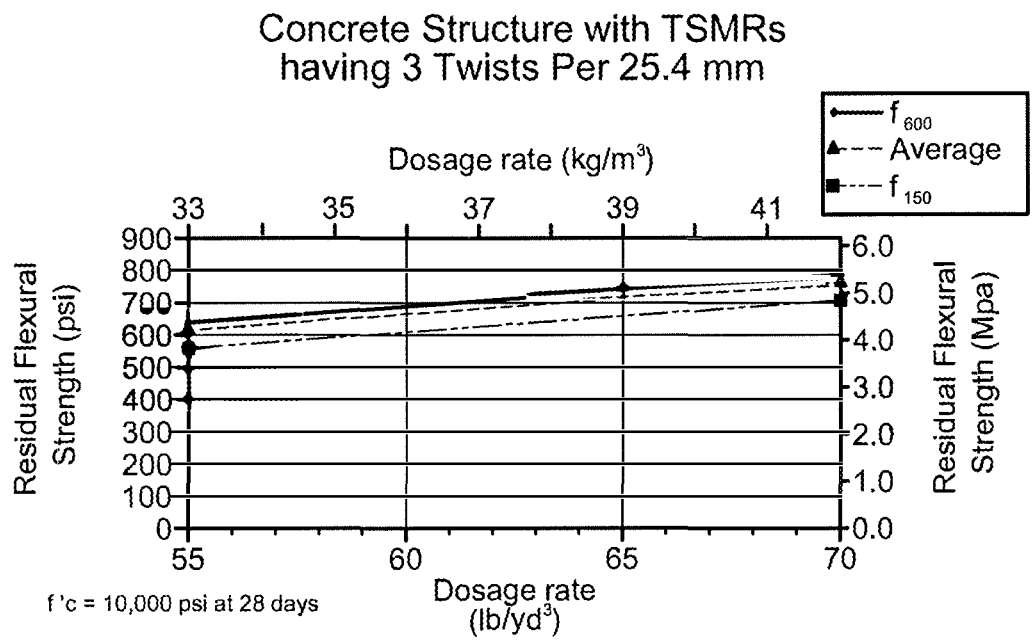
FIG. 5 is a graphical representation of residual flexural strength measured according to ASTM C 1609 for a concrete structure containing TSMRs with three twists per 25.4 mm plotted as a function of dosage rate.

Referring now to FIGS. 4 and 5, the residual flexural strength measured according to ASTM C 1609 for concrete structures containing TSMRs having two twists (FIG. 4) and three twists (FIG. 5) per 25.4 mm (1 inch) is plotted as function of dosage rate. These figures demonstrate the force carried in a standard ASTM C1609 test at L/600 and L/150 and the average of the two in a 69 Mpa (10,000 psi) concrete mix as a function of TSMR dosage. An increase in these values is observed as the dosage increases.

Figure 6:
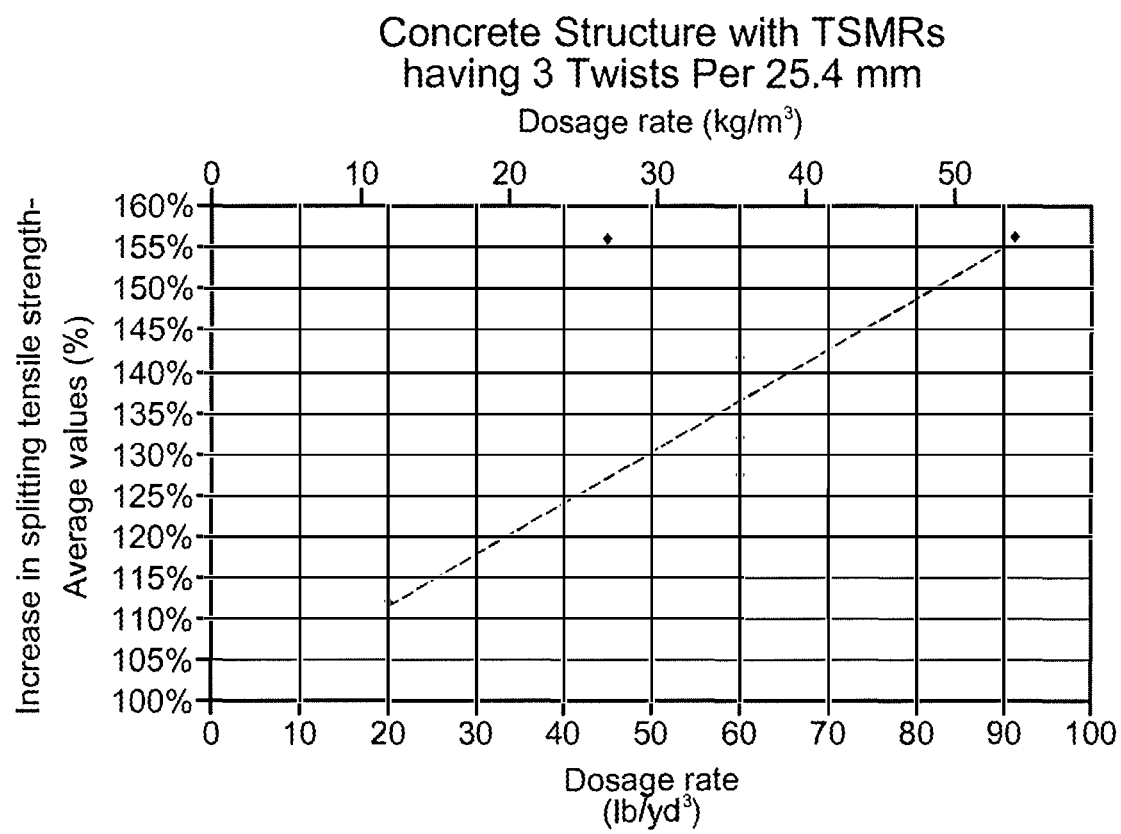
FIG. 6 is a graphical representation of the increase in splitting tensile strength measured according to ASTM C497 for a concrete structure containing TSMRs with three twists per 25.4 mm plotted as a function of dosage rate.

Referring now to FIG. 6 the increase in splitting tensile strength measured according to ASTM C497 for concrete structures containing TSMRs having three twists per 25.4 mm (1 inch) is plotted as a function of dosage rate. This figure demonstrates that the splitting tensile strength of the concrete increases as the dosage of TSMR increases.

TABLE 4

Application Specifications

| Application Type | Performance Specification | TSMR Type | Conventional Fiber Dosage | TSMR Dosage |
|---|---|---|---|---|
| Civil Tunnel Cast in Place Lining | ASTM C1609 L/450: 600 psi (4.13 MPa) | TSMR 8-50 3 Twist | 70 lb/yd³ 42 kg/m³ | 50 lb/yd³ 30 kg/m³ |
| Slab on Grade F'c = 4000 psi 27 MPa | ASTM C1609 average L600 and L/150: 200 psi (1.37 MPa) | TSMR 8-50 2 Twist | 25 lb/yd³ 15 kg/m³ | 15 lb/yd³ 9 kg/m³ |
| Precast Tunnel Segment | Splitting Tensile 700 psi: (3.1 MPa) | TSMR 8-50 3 Twist | 70 lb/yd³ 42 kg/m³ | 40 lb/yd³ 24 kg/m³ |
| Slab on Grade F'c = 4000 psi 27 MPa | ASTM C78 Modulus of Rupture: 700 psi | TSMR 8-50 3 Twist | N/A | 30 lb/yd³ 18 kg/m³ |
| Mining Tunnel Lining | EN 14651 f4 | TSMR 8-50 2 Twist | 70 lb/yd³ 42 kg/m³ | 42 lb/yd³ 25 kg/m³ |

According to another aspect of the present disclosure, the manufacturing method of preparing a matrix composite employs a type of variable speed drive technology, a variable gearbox, or a quick disconnecting pulley technology along with a continuous production operation that allows for adjustment of the number of twists applied to the fiber product without extensive set-up time or cost. The architecture for this manufacturing method also allows for quick change-overs from order to order and is flexible enough to provide either infinite adjustment of twist (e.g., ability to dial in the desired or required twist number) or to adjust to a commercially practical number of twist ratios using off the shelf pulleys or gearboxes.

Figure 7:
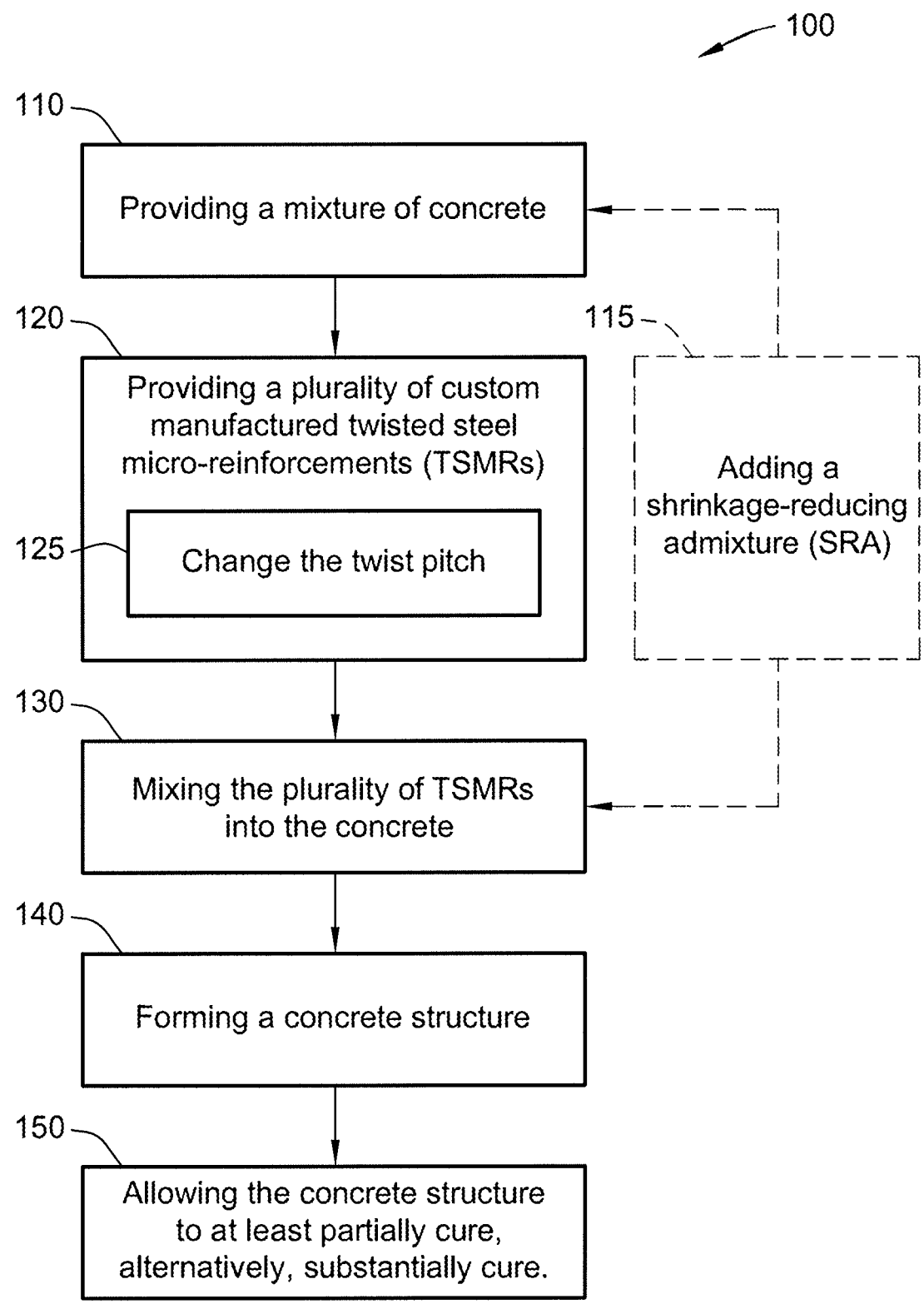
FIG. 7 is a schematic representation of a method for preparing a concrete structure according to the teachings of the present disclosure.

Referring to FIG. 7, a method 100 of forming a concrete structure is provided. This method 100 generally comprises: providing 110 a mixture of concrete; providing 120 a plurality of custom manufactured twisted steel micro-reinforcements (TSMRs); mixing 130 the plurality of TSMRs into the concrete; forming 140 a concrete structure; and allowing 150 the concrete structure to at least partially cure, alternatively, substantially cure. Each of the TSMRs has a twist pitch of two or more twists per 25.4 mm (1 inch) applied along its longitudinal axis. The TSMRs are made from a common base stock and have the number of twists predetermined such that a concrete structure formed with at least 10 wt. % per unit volume less TSMRs than fibers in a conventional concrete structure exhibits the same or better performance than the conventional concrete structure in one or more of a stress, deflection, energy, or crack mouth opening (CMOD) properties as determined through a defined standard test as defined herein. When desirable, a shrinkage-reducing admixture (SRA) may be incorporated 115 in to the concrete mixture when provided 110 or along with the TSMRs 130.

The method 100 may be a continuous process that further comprises one or more variable speed motor drives in order to increase or decrease the speed of the process and/or a twisting apparatus to change 125 the twist pitch applied along longitudinal axis of the TSMRs. The twist pitch of the TSMRs may be increased or decreased 125 during the method 100 without the need for a tooling change, but rather by changing at least one accessible gear or pulley located on a machine that is positioned within the process. This allows for variable pitch without the need for costly variable speed motor drives through the use of simple mechanical timing based on gear ratios.

According to another aspect of the present disclosure, the incorporation of a shrinkage-reducing admixture into the concrete structure enhances the performance of the concrete structure. As shown in Table 5, the incorporation of about 227 grams (8-oz) per cubic meter of a shrinkage-reducing admixture (SRA) unexpectedly enhances the compressive strength of a concrete structure that includes at least 5.3 kg/m 3 (9 lbs/yd³) of TSMRs in the mix by 10% or more; alternatively, about 13%. The amount of the SRA incorporated into the concrete structure is substantially less (e.g., about ¼) than the amount generally specified for reducing the potential of drying shrinkage cracking and curling.

The shrinkage-reducing admixture (SRA) used in the present disclosure may be specified or described as meeting ASTM C494 Type S. Higher dosages of the SRA can be used to further increase the compressive strength of a concrete structure up to about 20%. The use of the SRA may also increase the flexural strength of the concrete structure similar in magnitude to the enhancement observed for the compressive strength. Although not wanting to be held to theory, it is believed that the improvement comes from an enhancement in the strength of the bonding between the concrete mixture and the TSMRs.

TABLE 5

Properties with ASTM C494 Type S Shrinkage-Reducing Admixture

| | Compressive Strength (psi) | | |
|---|---|---|---|
| | Control No SRA | SRA 8 oz/m³ | SRA 16 oz/m³ |
| 12 day* | 4680 | 5110 | 5475 |
| 28 day* | 5460 | 6200 | 6510 |

*measured using ASTM C39 as average of 2 samples of ~15 cm (6 inch) x 30 cm (12 inch) in size Within this disclosure, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A composite material for use in forming a concrete structure, the composite material comprising:
   a concrete matrix formed of a mixture of aggregates and a paste; and
   a mixture of twisted steel micro-reinforcements (TSMRs) dispersed within the concrete matrix; the TSMRs having a variable twist pitch, wherein the mixture of twisted steel micro-reinforcements comprises a portion of the TSMRs having the twist pitch in the range of 2 to 3 twists per 25.4 mm (1 inch) and a portion of the TSMRs having the twist pitch that is in the range of 6 to 20 twists per 25.4 mm (1 inch) applied along its longitudinal axis.

2. The composite material according to claim 1, wherein the TSMRs include wires having a tensile strength of at least 1850 MPa.

3. The composite material according to claim 1, wherein the TSMRs include high carbon, cold-drawn, steel wires having a deformed shape.

4. The composite material according to claim 3, wherein the steel wires comply with ASTM A 820, Type 1.

5. The composite material according to claim 3, wherein the steel wires have a diameter that ranges from 0.5 mm to 2.0 mm.

6. The composite material according to claim 1, wherein the TSMRs comprise an aspect ratio of length (L) to diameter (D) that is between about 25 to about 100.

7. The composite material according to claim 6, wherein the TSMRs comprise a length (L) that is in the range from about 5 mm to about 100 mm.

8. The composite material according to claim 7, wherein at least a portion of the TSMRs have a diameter (D) of about 0.5 mm and a length (L) of about 25 mm or a diameter (D) of about 0.8 mm and a length (L) of about 50 mm.

9. The composite material according to claim 1, wherein the aggregates comprise gravel, crushed stone, or a mixture thereof.

10. The composite material according to claim 1, wherein the paste comprises water and Portland cement.

11. The composite material according to claim 1, wherein the composite material further comprises a shrinkage-reducing admixture (SRA) configured to enhance the performance of the concrete structure.

12. The composite material according to claim 11, wherein the SRA meet the requirements set forth for ASTM C494 Type S.

13. A concrete structure formed from the composite material of claim 1, wherein the number of twists for the TSMRs in the composite material are predetermined, such that the concrete structure exhibits at least 10% greater performance in one or more of a stress, deflection, energy, or crack mouth opening (CMOD) properties as determined through at least two defined standard tests than a similar concrete structure formed with the same amount by weight of steel fibers having one or two bends.

14. The concrete structure according to claim 13, wherein the at least two defined standard tests are independently selected as one from the group consisting of:
an un-notched deflection controlled beam test;
an un-notched load controlled beam test;
a splitting tensile test;
a deflection controlled notched beam test;
a test that measures average residual stress;
a panel test;
a direct tensioning test; and
a compression test.

15. A method of forming a composite material for use in forming a concrete structure, the method comprising:
forming a paste by mixing water and Portland cement;
mixing aggregates with the paste to form a concrete matrix;
providing a mixture of twisted steel micro-reinforcements (TSMRs) having a variable twist pitch, wherein the twist pitch for each of the TSMRs is in the range of 2 to 20 twists per 25.4 mm (1 inch) applied along its longitudinal axis with the twist pitch of a portion of the TSMRs being in the range of 2 to 3 twists per 25.4 mm (1 inch) and the twist pitch of a portion of the TSMRs being in the range of 6 to 20 twists per 25.4 mm (1 inch) applied along its longitudinal axis; and
dispersing the mixture of TSMRs into the concrete matrix to form the composite material.

16. The method according to claim 15, wherein the mixture of TSMRs are provided in a continuous process that comprises at least one of variable speed motor drives that increase or decrease the speed of the process or a twisting apparatus that changes the twist pitch applied along longitudinal axis of the TSMRs.

17. The method according to claim 16, wherein the twist pitch of the TSMRs is increased or decreased without the need for a tooling change, but rather by changing at least one accessible gear or pulley located on a machine positioned within the process.

18. The method according to claim 15, wherein the method further comprises adding a shrinkage-reducing admixture (SRA) to the concrete matrix, the SRA being configured to enhance the performance of the concrete structure.

19. The method according to claim 18, wherein the SRA meet the requirements set forth for ASTM C494 Type S.

20. The method according to claim 15, wherein the TSMRs include wires having a tensile strength of at least 1850 MPa.

21. The method according to claim 15, wherein the TSMRs include high carbon, cold-drawn, steel wires having a deformed shape.

22. The method according to claim 21, wherein the steel wires comply with ASTM A 820, Type 1.

23. The method according to claim 21, wherein the steel wires have a diameter that ranges from 0.5 mm to 2.0 mm.

24. The method according to claim 15, wherein the TSMRs comprise an aspect ratio of length (L) to diameter (D) that is between about 25 to about 100.

25. The method according to claim 24, wherein the TSMRs comprise a length (L) that is in the range from about 5 mm to about 100 mm.

* * * * *